United States Patent [19]

McFarland

[11] Patent Number: 5,020,676
[45] Date of Patent: Jun. 4, 1991

[54] STACKING PIPE PROTECTOR

[75] Inventor: Glenn E. McFarland, Humble, Tex.

[73] Assignee: Alco Industries, Inc., Valley Forge, Pa.

[21] Appl. No.: 469,257

[22] Filed: Jan. 24, 1990

Related U.S. Application Data

[63] Continuation-in-part of Ser. No. 423,049, Oct. 18, 1989, abandoned.

[51] Int. Cl.5 .................................................. A47F 5/00
[52] U.S. Cl. ................................... 211/59.4; 211/70.4; 248/74.1
[58] Field of Search ............................. 211/70.4, 59.4; 248/74.1

[56] References Cited

U.S. PATENT DOCUMENTS

| | | | |
|---|---|---|---|
| 2,689,139 | 9/1954 | Jones et al. | 211/70.4 X |
| 3,612,627 | 10/1971 | Fuller | 308/4 A |
| 3,652,138 | 3/1972 | Collett | 308/4 A |
| 3,894,780 | 7/1975 | Broussard | 308/4 A |
| 3,929,388 | 12/1975 | Sutko et al. | 308/4 A |
| 3,954,238 | 5/1976 | Nivet | 248/68 |
| 4,244,542 | 1/1981 | Mathews | 248/49 |

Primary Examiner—Robert W. Gibson, Jr.
Attorney, Agent, or Firm—Parmelee, Miller, Welsh & Kratz

[57] ABSTRACT

A two-part, ring-like, hook-on protector device provides a secure but easily removable mounting at spaced locations along heavy pipe or casing members that are normally stacked in a horizontal lengthwise extending relation for storage and shipment to oil and gas well drilling and operating locations. The device, of two-part, pivoted together construction and circular shape, is formed of tough elastomer material whose parts are of complementary interfitting construction devised to assure a substantially equally spaced, stacked relation between adjacent pipe members to both protect the members along their lengths as well as any threaded ends and collars. It has a maximum unitized strength and a space-retaining resistance to deformation with respect to radially applied forces thereon when several devices are mounted in a lengthwise spaced relation along a pipe member that is in a stacked relation with adjacent members. It employs two solid, stress-absorbing pivoted-together, semicircular pairs, halves or arms. At least one pair of adjacent ends of its arm parts are pivotally connected together and the other pair of adjacent ends have a separable connection to permit the parts to be opened as well as closed for easy latching-on mounting and unlatched removal from pipe members that are being stacked for storage and those that are being removed for usage.

19 Claims, 3 Drawing Sheets

STACKING PIPE PROTECTOR

This is a continuation-in-part of copending application Ser. No. 07/423,049 filed on Oct. 18, 1989, now abandoned.

This invention pertains to a hook-on and lift-off, encircling, reusable pipe stacking protector for use in a longitudinally spaced relation along heavy duty pipe members, such as those used in the oil and gas fields. It particularly pertains to a protector device that will withstand the wear and tear, not only of stacking and unstacking pipe members in a storage yard or shed, but particularly, in stacking and preventing their damage during cross-country transportation or on barges to offshore drilling platforms.

BACKGROUND OF THE INVENTION

Heretofore, it has been the practice to separate layers of stacked piping pyramid with horizontally positioned, cross extending wood timbers. However, this method is not satisfactory from a number of standpoints, for example, it does not prevent damage entailed between pipe members of each layer due to their movement horizontally against each other. Further, it does not provide a positive means for preventing movement of the pipe members as stacked and entails difficulty in attempting to work slings or hooks around pipe members in the stack when they are to be removed for usage. In fact, this is a rather dangerous operation using the conventional type of timber stacking approach.

Also, in evaluating the matter, I determined that a suitable device for giving pipe members suitable stacking protection should be relatively simple and inexpensive in construction, but able to fully withstand the stress and strain involved, be reusable, easily mountable, accessible and removable, and so-mountable as to enable easy and effective access to pipe members by personnel and handling equipment.

The present invention solves these problems and enables both vertical and horizontal separation of each pipe section with respect to adjacent pipe members or sections.

There have been unitary, multiple pipe receiving, end positioned stacking structures which are adapted to separate pipe members, but these have been too complex and expensive, are easily subject to damage and are of limited usage from the standpoint of the number of pipe members which can be handled in this manner. They are generally not reusable and have not been accepted for these and other reasons. There have also been protectors that are mounted about pipe members that are to be actively used in drilling operations. These devices are complex and costly, since they are specially designed for frictional operation in wells in which they are used, see U.S. Pat. Nos. 3,929,388 and 3,894,780. They are different in their overall purpose and are not designed or constructed for the present contemplated type of usage. They are used, for example, to protect a well pipe drilling string from abrading against the surrounding casing or well bore hole walls.

There are also clamp constructions for more or less permanently mounting cables, piping and conduits in place on walls, vehicle frames and side boards, etc., see U.S. Pat. No. 3,954,238. Also, U-shaped rack units have been devised for supporting a group of underground electrical conduits, see U.S. Pat. No. 4,244,542, as well as the above-mentioned end positioned article storage racks, see U.S. Pat. No. 4,099,626. However, to date, I have not heretofore found anything in the nature of reusable and practical means for the problems here involved.

OBJECT OF THE INVENTION

It has been an object of my invention to solve the problems heretofore presented in this art.

Another object has been to devise a simple, highly practical, hook-on and lift-off, pipe encircling, individualized collar type of pipe protector device.

A further object has been to provide a protector device that will be relatively inexpensive but that will be so constructed as to be fully reusable from the standpoint of having a maximized strength and equalized distribution of stress and strain throughout its full extent when in a mounted pipe supporting position.

These and other objects will appear to those skilled in the art from the specification and the appended claims.

SUMMARY OF THE INVENTION

In devising a device which will solve the problems that have been heretofore presented in the pipe stacking art, I have found that it is important to provide a strong but suitably shock absorbent elastomer type of material, as an optimum, a molded, high density polyurethane. Molded rubber, injected molded plastics are alternative materials. It should have a thickness such that, in combination with, for example, a group of like devices, it will be practical for positioning pipe members at the bottom as well as the top of a heavy weight stack. The bottom location represents the extreme weight usage to which the devices are subjected in a typical stack. For example, a bottom row may be subjected to 6000 pounds of weight. The devices must have a sufficient rigidity to retain each pipe member in a spaced relation and also when the member is of a type having an inside threaded collar end which is of slightly larger diameter.

In the above connection, I have devised a maximized strength and equalized force transmitting type of connected mounting between its pair or two sets of semicircular parts or arms in such a manner as to make use of the full cross-sectional thickness of the arms at their two joints of pivot connection with respect to each other. At least one pair of connected ends should be of a pivot type to enable the two arms to swing outwardly and with respect to each other for mounting and dismounting the device. The other pair of connected ends should be provided with a removable connecting means that will preserve the strength of the overall section of the device that will be easily accessible, locked and unlocked, and will be detachably removable from a pipe member. If desired, both pairs of pivoted connections may be of like detachable construction to facilitate their pivotal separation from either side of a stack of pipe members. The devices not only enable pipe members to be stacked in a fully "around" supported and spaced relation with respect to each other, but will also facilitate the use of conventional pipe handling slings, gumbo pots or hooks for both stacking and for progressively removing pipe members from a stack.

The use of stepped joints between the two parts or arms provides a full cross-sectional abutting engagement between them. As shown, each joint has two cross cuts of equal depth or extent connected by a centrally positioned lengthwise cut of much greater extent and through which a pivot or connecting pin extends. This has been found that to provide a maximized strength in the joints of the protectors elastomer body. The connections of the two semi-circular arms enables an even and substantially full transmission of crushing force along the full cross-sectional thickness of its circular or ring-shaped body that, in its closed position, extends circumferentially about a pipe member on which it is mounted.

The two-part, ring-like protector device of my invention is adapted for secure but easily removable mounting at spaced locations along heavy pipe or casing members that are normally stacked in a horizontally extending relation with other members, preferably in a somewhat pyramidal stacked relation at well drilling or operating locations, as well as for storage and shipping. The device, of two-part pivoted together construction and of circular shape, is of elastomer material whose parts are of complementary interfitting construction that is devised to assure a substantially equally-spaced, stacked relation between adjacent pipe members. The device has a pair of semi-circular parts in a pivotal connected relation that assures a maximum unitized strength and resistance to deformation with respect to circumferentially or axially as well as radially applied forces directed thereon when several devices are mounted in a tight, fully enclosing, somewhat uniformly lengthwise space-apart relation along a pipe member that is in a stacked relation with adjacent members. The device employs two solid, stressabsorbing, pivoted-together, semicircular pairs, halves or parts. At least one of its pairs of connecting pivot ends is separable to permit the parts to be spread apart for easy mounting on and removal from pipe members that are being stacked for storage and those that are being removed for usage. It is important that the device be reusable and thus not damaged in its mounting-on use and removal. The device uses a pair of stepped joints between it parts through which a latch or pivot pin is adapted to be positioned. A ring and an attaching chain, cable or like means are connected between a through-extending latch pin and the body of the device to prevent loss of the pin when removed and to permit pivotal swing of the halves of the body about a pivot pin connecting the other ends of the halves, both for mounting and dismounting the device with respect to a pipe member that is to be protected.

Figures 1, 2:
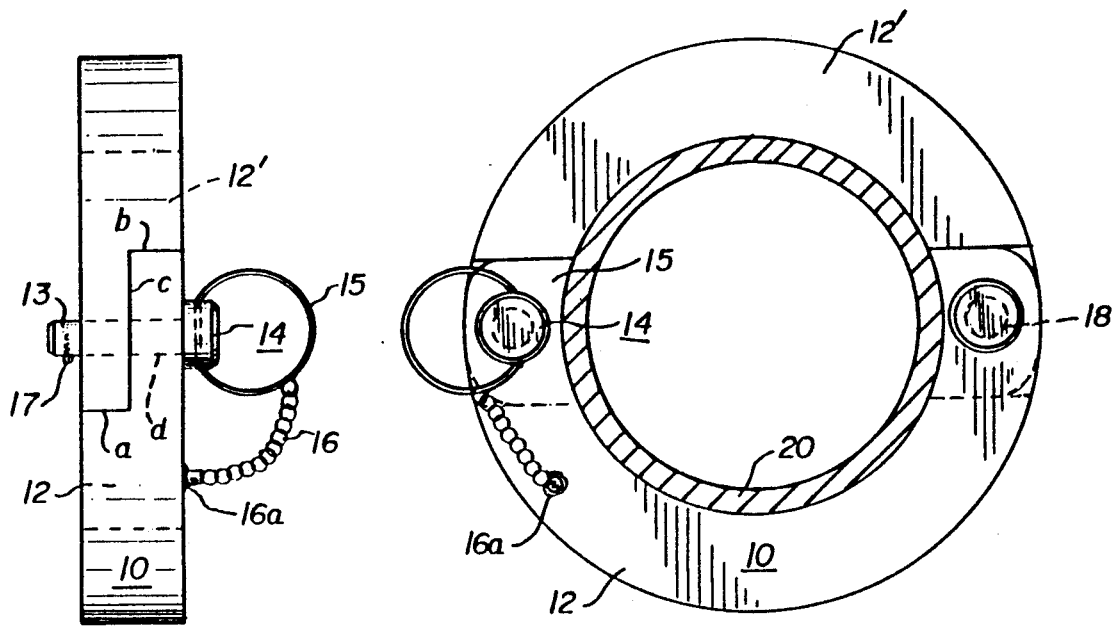
FIG. 1 is an end view in elevation on a reduced scale illustrating a hook-on and lift-off pipeencircling collar type of protector device constructed in accordance with my invention.
FIG. 2 is a side view on the same scale as and showing the protector device of FIG. 1; in this view as in the view of FIG. 1, the device is in a closed and locked, circle defining relation; this view also shows the device in a normal latched-on position on a pipe member that is to be protected.
Figures 1A, 1B:
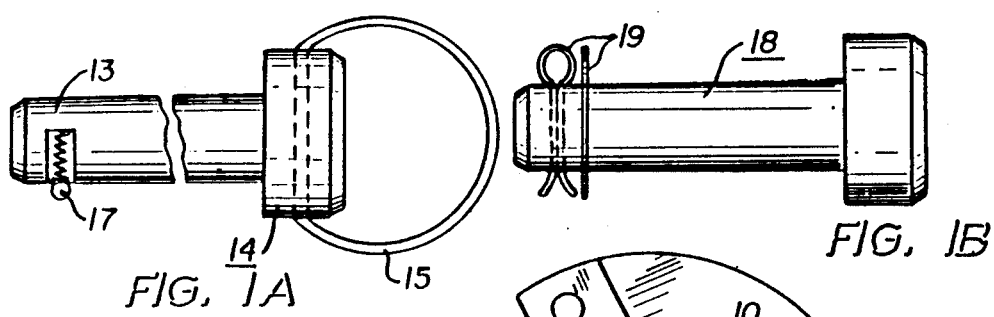
FIG. 1A is an enlarged fragmental view showing a ball detent for a pin which is representative of a self-retaining easily removable latch pin device.
FIG. 1B is a side view on the scale of FIG. 1A showing representative means for retaining the pivot pin of FIG. 2 in position on a semi-permanent basis as at a hinge joint between ring-like halves of the device.
Figure 6:
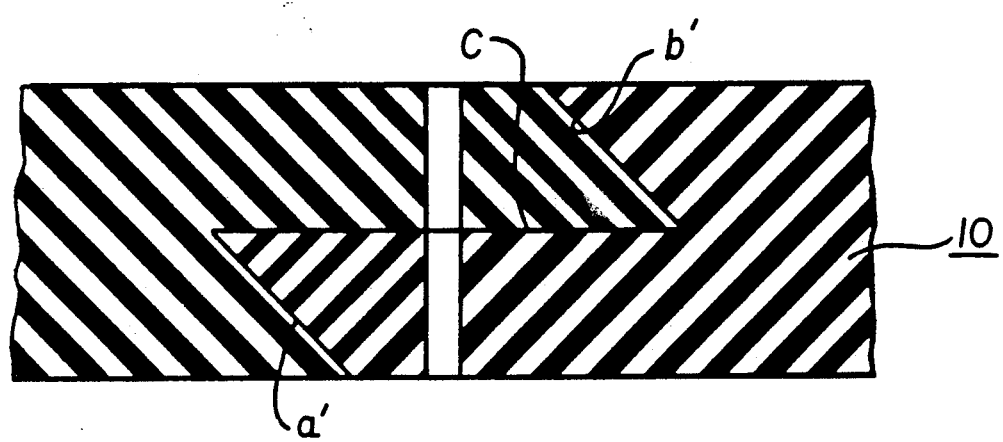
FIG. 6 is a slightly enlarged fragmental crosssection showing an optimum type of joint which minimizes the effect of force applied thereacross, such as involved when pipe members are in a stacked relation.
Figure 7:
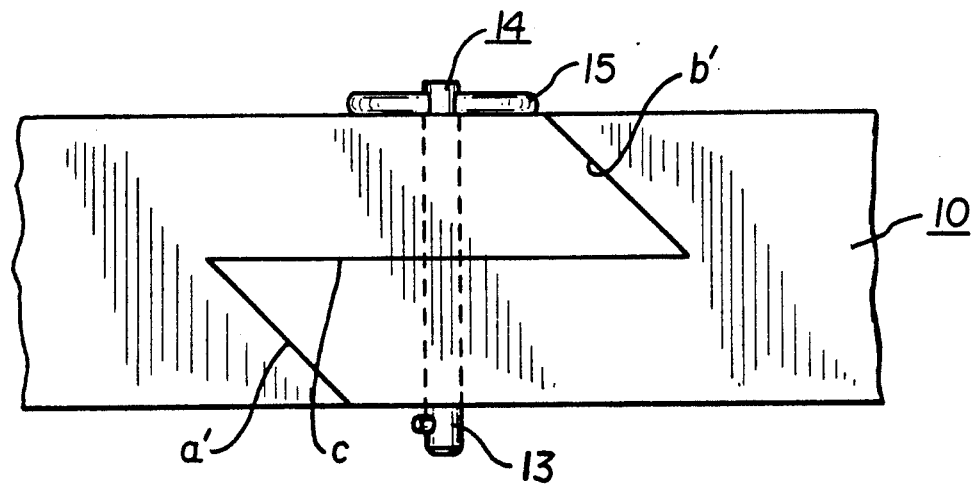

And, FIG. 7 is a side fragment on the scale of and of the joint of FIG. 6 showing the pin of FIG. 1A latched and with its ring in the position shown in FIG. 2.

DETAILED DESCRIPTION OF THE DRAWINGS

Figure 3:
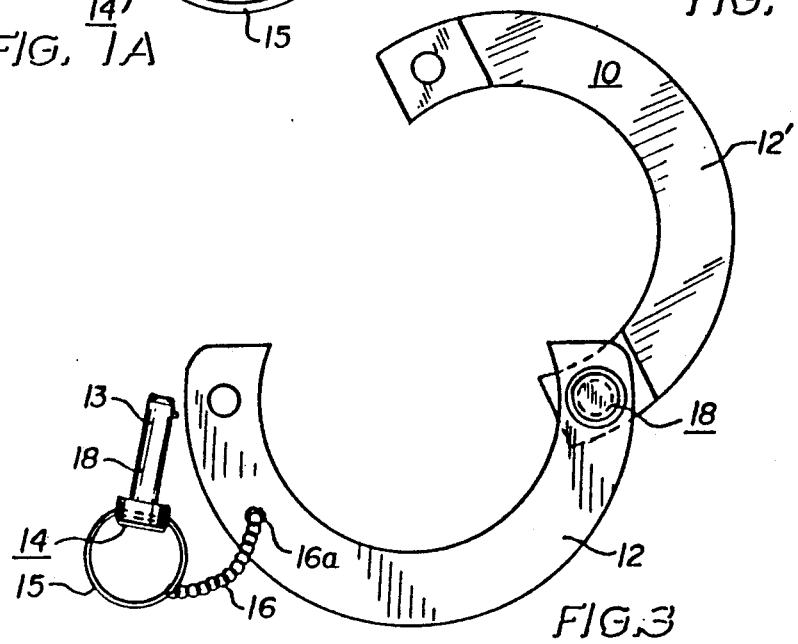
FIG. 3 is a slightly reduced side view of the device with its pair of semi-circular arms in an open, ready to hook-on relation with respect to each other.

First referring to FIGS. 1, 2 and 3, I have shown a hook-on and lift-off, pipe encircling protector device 10 made up of two pair of semi-circular arms 12 and 12' that have complementary interfitting and interlatching end face portions a, b and c. As shown particularly in FIG. 1, the arms are shown of step-like, solid elastomer construction fully across their substantially rectangular sections. Importantly, their connecting joint ends are of similar construction and not only fully interlatch with each other, but also do so in such a complementary manner that engagement between such latching ends represents a full force transmission engagement along the full cross sectional extent or width of the device. Also in FIG. 1, staggered transverse or cross-cut abutting face portions a and b are shown of an equal extent that is shorter than the centrally extending axial extent of longitudinally extending, connecting abutment face portion c. The abutment face portions c may have a length of about four times the length of or b to define interfitting lip portions through which a pivot pin 18 or a pivot latch pin 14 is adapted to centrally extend.

Figure 4:
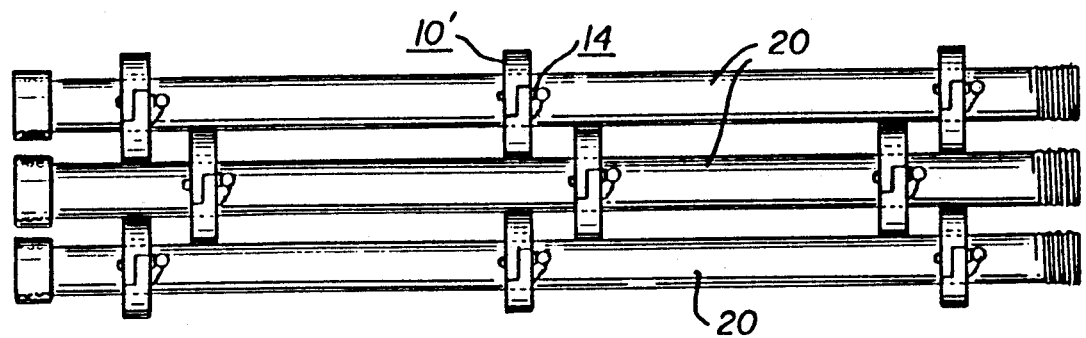
FIG. 4 is a greatly reduced view taken along the line IV—IV of FIG. 5 and showing pipe members in a spaced-apart stacked relation employing longitudinally spaced-apart devices of my invention.
Figure 5:
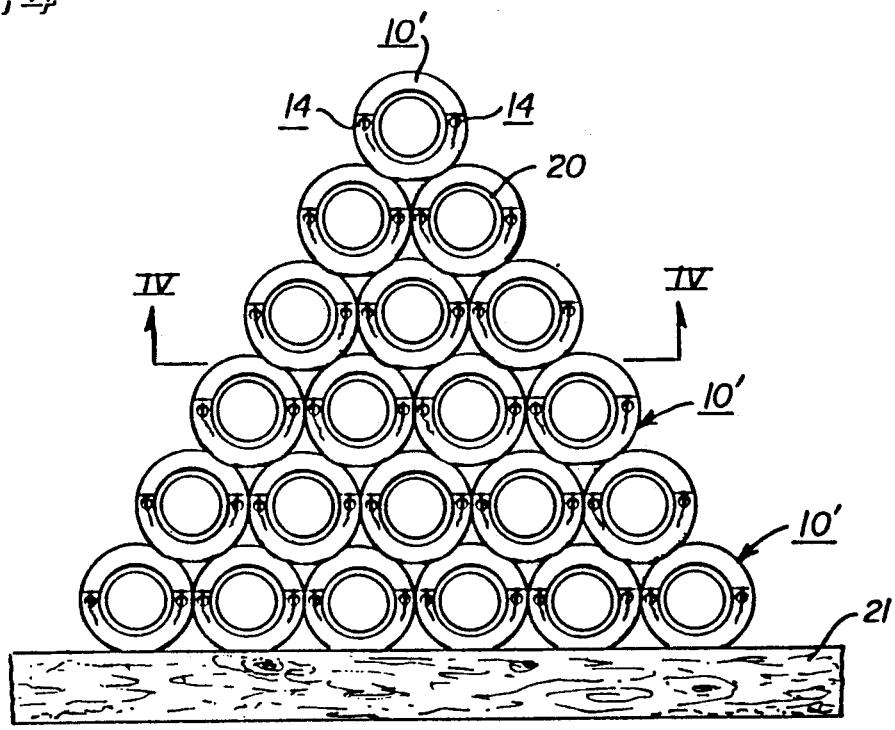
FIG. 5 is an end elevation showing pipe members in a typically pyramidal relation employing protector devices of my invention.

At least one latch pin 14 will be provided, as shown in FIG. 3, to enable the device 10 to be opened to mount it in a hooked-on relation with respect to a pipe member 20 when it is to be stacked, as for example shown in FIG. 5, or is to be removed when pipe members 20 are to be put into use, for example, in a well hole, or connected and laid as a gas or oil line. Although, an ordinary pivot pin assembly 18 (see FIG. 1B) may be used for one set of joints, a latch pivot type of pin 14 may be used for both sets of joints, where, see the device 10' of FIGS. 4 and 5, it is advantageous to enable the devices 10 to be unlatched and removed from either longitudinal side of a stack of pipe members 20.

Again referring to FIGS. 1 and 2, latch pin 14 is shown having an enlarged head at its one end and also as having a ring 15 extending therethrough which is secured by a loose, linked chain, cable or loop means 16 to an outer side of the body of the device, as by a suitable cement 16a. Thus, the pin 14 cannot get lost when it is removed from its latching position and is always available for usage. To removably retain the pin 14 in its latching position of FIG. 1, I have shown a spring-pressed ball detent 17 (see FIG. 1A) as positioned to operate within a cross-bore in the outer end of its stem 13, as normally pressed outwardly by an attached small spiraled tension spring 17a, see also FIG. 1A.

As shown in FIG. 2, one joint between the two semi-circular pair of arms 12, 12' may be of a more permanent pivot type, for example, as provided by a double headed pin or, as shown, a single headed pin 18 held in place by a cotter pin and washer assembly 19, see FIG. 1B.

In FIG. 4, the devices 10 are shown mounted in a substantially equal longitudinally spaced relation along each pipe member 20 and in a staggered relation along adjacent pipe members. FIG. 5 shows a typical pyramidal stacking of pipe members on a suitable platform, such as a strong wooden (e.g. oak) platform or pallet 21. The devices 20 are shown provided with dual functioning connectors 10' at both ends of their semicircular arms or parts 12 and 12'.

The joint construction of FIGS. 6 and 7 like the construction of FIG. 1, assures an in-line, circumferential or axial transmission of force along a joint of the arms or ring parts 12, 12' at the location of their hinge joint 18 as well as at the area of their latch pin connection. However, it additionally assures a holding position retention of an easily removable pin, such the latch pin 14 when, for example, the weight of a stack of pipe members 20 causes a compressed, cross distortion of the protector device in the area of the latch pin 14, such that movement or vibration of the cargo occurring in shipment by truck, train or boat may cause the pin to release from its latching position. The zigzag shape of the joint of FIG. 6 assumes that such an adverse result will not occur. It will be noted that intermediate face portion c that extends centrally axially of the joint corresponds to the face portion c of the embodiment of FIG. 1, but that the cross-cut, transverse face portions a' and b' of the embodiment of FIGS. 6 and 7 are longer than the portions a and b of the embodiment of FIG. 1, slope in opposite directions and, as shown, at about a 45° angular relation with respect to the face portion c. This construction, in effect, locks the arm or ring parts in an aligned relation at the joint even when a heavy, normally crossdistorting force is applied thereto and when the device is being subjected to vibration.

As shown, the joint of FIGS. 6 and 7 whose interfitting abutting end face portions a', b' and c are of complementary Z-shape thereacross, define a zigzag type of connection that minimizes weight and movement caused body distortion. Such a joint is fool-proof from the standpoint of the use of an easily removable latch type of pin, such as 14, in that it positively assures a retention of such a type of pin in its latching position under adverse conditions of protector device usage. If desired, it may also be employed in place of the type of joint shown in FIG. 1 which uses a hinge pin 18, such as shown in FIG. 1B.

In carrying out the invention, the elastomeric material, such as high density polyurethane polymer is soft enough to avoid damage to the pipe members and is strong enough to support the weight of the members as stacked without flattening-out under weights of upwards of 2000 pounds or more. The inner diameter of the devices will be slightly larger than the outside diameter of the pipe members, and the outside diameter of the devices will be larger than the outside diameter of the pipe member plus an allowance for a slight compression. Also, the devices must be capable of fully opening to the diameter of the pipe members, capable of being securely locked and easily unlocked with respect to the pipe member, and essentially should be reusable. It will be noted that the devices have flexibility in their use from the standpoint of their spaced relation longitudinally with relation to adjacent devices along the length extent of the pipe members. The construction shown enables each of the two arms to be formed in the same mold to simplify and thus decrease the cost of manufacturing operations.

What is claimed is:

1. In a hook-on and lift-off pipe-encircling collar type of stacking pipe protector device for, in combination with a spaced apart group of the same devices, positioning horizontally extending heavy pipe members such as those used in oil field operations in a protected vertically spaced apart and stacked relation with respect to each other, a pair of pipe encircling arms of semicircular shape adapted to be removably mounted in an end to end closed encircling relation on and about the circumference of a pipe member and having a sufficient strength to support a lengthwise extending pipe member in combination with a horizontally spaced-apart group of like devices in such a manner as to retain the pipe member along its full length extent in a vertically and horizontally spaced-apart stacked relation with respect to other pipe members, each of said arms being of elastomer material having a strength and cross-sectional thickness sufficient when mounted in an encircling relation about a pipe member to maintain the pipe member in a vertically spacedapart relation with respect to adjacently stacked-on pipe members, said arms having a pair of adjacent end portions in an interlatching cross sectionally aligned and abutting relation with each other, and means detachably connecting said pair of adjacent end portions of said arms in a cross sectionally aligned and abutting relationship with respect to each other for mounting and dismounting the device with respect to a pipe member.

2. A device as defined in claim wherein said detachable means is a through-extending pin.

3. A protector device as defined in claim 2, wherein pliant means extends from one end of said detachable pin and is connected to one of said arms for retaining said pin when it is detached from a connecting relation with respect to said arms.

4. A protector device as defined in claim 2, wherein said detachable pin has a spring-pressed detent means in a transversely extending operating relation at a forwardly extending end thereof for retaining it in a latching position when the device is mounted in an encircling relation on a pipe member.

5. A protector device as defined in claim 2 wherein said arms have an opposite pair of adjacent end portions that are connected in a cross sectionally aligned and hinged relation with respect to each other.

6. A protector device as defined in claim 2 wherein said pair of adjacent end portions define a cross sectional Z-shape along abutting surfaces therebetween.

7. A hook-on pipe-encircling protector device for use in combination with a lengthwise spaced-apart group of the devices for positioning a pipe member in a protected spaced-apart stacked relation with respect to adjacent pipe members which comprises, a pair of semi-circular elastomer pipe encircling arms of sufficient strength when in position about a pipe member to, in combination with a spaced-apart group of like devices, support the pipe member along its lengthwise extent; each of said semi-circular arms having opposite end portions that are complimentary and align with and interlatch with an adjacent opposite end portion of the other said arm to, in combination, define a continuous substantially circular structure; mounting pins adapted to extend through the adjacent aligned end portions of said arms to define a unitary circular shaped device, one of said pins being detachable for enabling a pivotal swing separation of said arms about the other of said pins for mounting and removing the device from a position about a pipe member, and means for detachably retaining said one pin in a mounted relation between said pair of arms of the device.

8. A protector device as defined in claim 7, wherein said interlatching ends are of solid section and have a full cross-sectional abutting relation with each other when the device is positioned in a circular supporting relation about a pipe member.

9. A protector device as defined in claim 7, wherein said interlatching ends have a complementary stepped cross-sectional abutting relation with respect to each other when the device is in an encircling mounted relation on a pipe member.

10. A protector device as defined in claim 7 wherein said pairs of opposite ends of said arms are of solid section, and at least one pair of opposite ends of the device are of complementary interfitting Z-shape across the joint defined therebetween.

11. A protector device as defined in claim 10 wherein said one of said pins which is detachable extends across intermediate connecting portions of the Z-shape.

12. A protector device as defined in claim 7 wherein, at least one of said interlatching end portions has a joint defined by a pair of cross-extending faces extending inwardly from opposite sides of the device in a staggered relation with respect to each other, and also has an intermediate face extending axially of the device and connected at its opposite ends to inner ends of said cross extending faces to define the associated joint.

13. A protector device as defined in claim 12 wherein said one of said mounting pins extends across said associated joint substantially centrally through said cross extending faces thereof.

14. A protector device as defined in claim 12 wherein said pair of cross-extending faces extend in a zigzag relation with respect to an axially extending intermediate face to therewith define a Z-shaped joint.

15. A protector device as defined in claim 14 wherein each of said cross-extending faces extends in an angular relation of about 45° with respect to a central axis of said device.

16. In a hook-on, latch-on and lift-off pipe-encircling collar type of supporting protector device for heavy duty pipe members, a pair of solid body semicircular arms of an elastomer material having complementary connecting end portions adapted to interfit with each other in such a manner as to substantially fully transmit force axially therealong between said arms in the manner of a continuous ring, one pair of complementary end portions being pivotally connected together, and the other pair of complementary end portions being detachably connected together.

17. A protector device as defined in claim 16 wherein each said pair of complementary end portions is of Z-shape across the body of said arms.

18. A protector device as defined in claim 16, wherein said complementary end portions define connecting joints of steplike shape in which cross-extending portions of the joints are of shorter extent than cooperating lengthwise-extending portions thereof, and a pin is adapted to be positioned to extend through the cooperating lengthwise-extending portions of said arms at each of the joints to retain said arms in a connected circular-shaped relation, and at least one of said pins is detachable to enable a swing-out opening of said arms with respect to each other for mounting the device on and removing it from an encircling position about a pipe member that is to be protected.

19. A protector device as defined in claim 18 wherein, means flexibly secures said detachable pin to one of said arms, and said detachable pin has a spring-pressed detent for removably retaining it in a through-extending connecting position with respect to a associated joint between said arms.

* * * * *